ated Apr. 17, 1973

3,728,334
6 - (1 - CARBOXYCYCLOALKYLCARBOXAMIDO) PENICILLANIC ACID, DERIVATIVES AND SALTS THEREOF
Kenneth Butler, Old Lyme, Ronnie D. Carroll, East Lyme, and Ernest S. Hamanaka, Groton, Conn., assignors to Pfizer Inc., New York, N.Y.
No Drawing. Filed Mar. 3, 1971, Ser. No. 120,762
Int. Cl. C07d 99/16
U.S. Cl. 260—239.1     24 Claims

ABSTRACT OF THE DISCLOSURE

A novel class of broad spectrum antibiotics derived from 6 - (1 - carboxycycloalkylcarboxamido) penicillanic acids and derivatives and salts thereof.

BACKGROUND OF THE INVENTION

This invention relates to a novel series of chemotherapeutic agents, and in particular to congeners of 6-(1-carboxycycloalkylcarboxamido)penicillanic acid and to esters and salts thereof, possessing high antibacterial action following oral administration.

The compounds in the group belonging to the family of penicillins differ from each other in the nature of the R variable and possess the general formula indicated below wherein the acyl moiety on the 6-aminopenicillanic acid is derived from a carboxylic acid or functional derivative thereof such as an acyl chloride or anhydride.

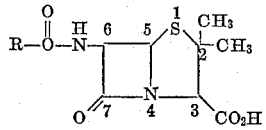

The pharmacodynamic and antibiotic properties of a given penicillin are determined to a great extent by the nature of the R group. The most widely used penicillins are those wherein the R moiety is represented by benzyl, phenoxymethyl- and α-phenoxyethyl-. While these well-known analogs are highly antagonistic toward gram-positive micro-organisms they are relatively ineffective against the so-called antibiotic resistant strains of bacteria, and of limited gram-negative activity, important causes of severe infections and deaths in hospitals today and are readily destroyed by penicillinase. Consequently, drugs which will combat rise in Staphylococci incidence and fatality and gram-negative infections, e.g., Pseudomonas, are of immeasurable value to the medical profession.

Recent efforts to improve the profile of activity within the family of penicillins has resulted in the synthesis of α-carboxybenzylpenicillin (U.S. Patent 3,142,673), a broad spectrum antibiotic with greater efficacy against gram-negative infections via the parenteral route of administration. More recently, broad spectrum activity has been claimed for a series of α-sulfo acyl penicillins and cationic salts thereof in Netherlands specification 6,914,718, published Apr. 1, 1970.

SUMMARY OF THE INVENTION

The novel antibacterial 6-(1-carboxycycloalkylcarboxamido)penicillanic acids of this invention are represented by the formula:

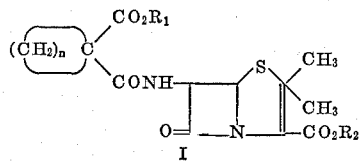

where:

$R_1$ and $R_2$ are each selected from the group consisting of hydrogen; alkyl containing from 1 to 4 carbon atoms; cycloalkyl containing from 3 to 8 carbon atoms; indanyl; naphthyl; α-alkanoyloxyalkyl where the alkanoyl group contains from 2 to 5 carbon atoms and the alkyl contains from 1 to 6 carbon atoms; phenyl and substituted phenyl where the substituent is selected from the group consisting of alkyl, alkoxy and alkylthio containing from 1 to 3 carbon atoms, fluorine, chlorine, bromine and trifluoromethyl; phenylalkyl and substituted phenylalkyl where the alkyl group contains from 1 to 3 carbon atoms and the substituent is selected from the group consisting of alkyl, alkoxy and alkylthio containing from 1 to 3 carbon atoms, fluorine, chlorine, bromine and trifluoromethyl;

$n$ is an integer from 2 to 6; and the pharmaceutically acceptable basic salts of those compounds wherein at least one of $R_1$ and $R_2$ is hydrogen.

Of particular interest, because of their antibacterial activity, are the diacids of Formula I wherein $R_1$ and $R_2$ are both hydrogen and $n$ is an integer of from 2 to 6 and monoesters wherein $R_1$ is hydrogen, $R_2$ is α-alkanoyloxyalkyl wherein the alkanoyl group contains from 2 to 5 carbon atoms and the alkyl group contains from 1 to 6 carbon atoms, and $n$ is an integer of from 2 to 6.

In addition to their unexpected and significant activity against the antibiotic resistant Staphylococci and against Pseudomonas and *Escherichia coli*, the novel products of this invention are resistant to destruction by penicillinase, the penicillin destroying enzyme elaborated by many micro-organisms, and are also antagonistic toward gram-positive micro-organisms.

DETAILED DESCRIPTION OF THE INVENTION

The novel and valuable compounds of the present invention are prepared from 6-aminopenicillanic acid by any of several known methods for introducing an acyl substituent into a primary amine. They can, for example, be prepared by the acylation, in a reaction-inert solvent, of 6-aminopenicillanic acid with a functional derivative of one of the carboxy groups of the desired cycloalkane-1,1-dicarboxylic acid, $(CH_2)_nC(CO_2H)_2$, such as the corresponding acid chloride, bromide, or anhydride, especially the mixed anhydride with other carboxylic acids such as ethoxy and isobutoxy carbonic acid, at a pH value of from about 6 to about 9 and at a temperature of from about 0° C. to about 50°C. The acylation can be conducted under a wide variety of conditions. It can, for example, be conducted in an aqueous reaction medium of an unstable emulsion of water and a water-immiscible organic solvent such as methyl isobutyl ketone and lower alkyl acetates over the pH range of about 2 to 4 and a temperature range of about 0° C. to 50° C. It can also be carried out over the pH range of from about 6 to 9 is an aqueous solution (water or water acetone) at a temperature of from 0° C. to 50° C.

Alternatively, they can be prepared by the reaction of 6-aminopenicillanic acid with the appropriate acid reactant in the presence of a condensing agent, e.g., a carbodiimide such as 1,3-dicyclohexylcarbodiimide, or an alkoxyacetylene such as ethoxyacetylene. Additionally, the appropriate monoacid azide, or an active ester or thio ester of the carboxy moiety of the acid reactant with a phenol or thiophenol can be used as acylating agent. Further, the 6-aminopenicillanic acid can first be converted to a mono- or disilyl derivative by reaction with a trialkylsilyl halide or a trialkylsilylamine which is then acylated with an appropriate organic acid acylating agent (a carboxylic acid, acid anhydride or acid halide) and hydrolyzed to remove the protecting group (the "silyl" method) as described in U.S. Pat. 3,249,633.

The cycloalkane-1,1-dicarboxylic acid reactant or functional derivative thereof can, depending, of course, upon the pH of the reaction mixture, be used as the free acid or as an alkali metal or amine salt of the free acid group. The tri(lower alkyl)amine salts, especially the triethylamine salt and the N-ethylpiperidinium salt, represent convenient forms of the cycloalkane-1,1-dicarboxylic acid reactant particularly when a monomixed anhydride of the diacid is used as acylating agent. Such salts are of definite value when the acylation is conducted in a nonaqueous system. In such instances an amine salt, e.g., the triethylamine or N-ethylpiperidine salt, of the 6-aminopenicillanic acid serves as suitable form of the 6-aminopenicillanic acid. The acylation, when conducted in a nonaqueous system, is generally conducted at an initial temperature of as low as −40° C. during the combining of the reactants and is then gradually raised to room temperature or higher, e.g., about 50° C., if necessary.

In addition to the above purely chemical techniques of acylation, a sonochemical technique, that is, the application of vibrations of ultrasonic frequency (35,000 to 90,000 cycles per second), as described in U.S. Pat. 3,079,314, can also be used to achieve acylation of 6-aminopenicillanic acid, especially acylation with an acid halide or anhydrie. Acylation under such conditions is rapid and permissive of a wide range of reaction media, aqueous and non-aqueous halide, homogeneous and non-homogeneous, including emulsified, systems.

Of the several known methods for acylating 6-aminopenicillanic acid cited above, the favored routes employ and acid halide or mixed anhydride of the appropriate cycloalkane-1,1-dicarboxylic acid reactant and a non-aqueous, reaction-inert media. The temperature range of from 0° C. to 50° C. and pH range of from 6 to 9 are favored.

The monoesters of this invention, compounds of Formula I wherein $R_1$ is alkyl, cycloalkyl, indanyl, naphthyl, α - alkanoyloxyalkyl, phenyl, phenylalkyl or substituted phenyl or phenylalkyl and $R_2$ is hydrogen are prepared by acylation of 6-aminopenicillanic acid with an appropriate cycloalkane-1,1-dicarboxylic acid monoester. Activation or functionalization of the free carboxyl group can be made by any of the aforedescribed procedures, e.g., acid chloride or mixed anhydride. Again, the preferred method for acylation of 6-aminopenicillanic acid employing the monoester—acid chloride or—mixed anhydride employs a reaction-inert, nonaqueous solvent and a temperature of about 0° C. to 50° C. and a pH of from about 6 to 9.

Compounds of the instant invention wherein $R_1$ and $R_2$ are hydogen can be prepared by room temperature hydrolysis of the aforedescribed monoesters using an aqueous pH 9 borate buffer. Isolation of the desired product is achieved by acidification of the reaction mixture followed by extraction of the diacid into a water immiscible solvent such as ethyl acetate.

The monoesters of this invention, compounds of Formula I wherein $R_1$ is hydrogen and $R_2$ is alkyl, cycloalkyl, indanyl, naphthyl, α-alkanoyloxyalkyl, phenyl, phenylalkyl or substituted phenyl or phenylalkyl are synthesized by acylation of the requisite 6-aminopenicillanic acid ester with the appropriate cycloalkane-1,1-dicarboxylic acid per se or functionalized as one of the aforedescribed acylating derivatives, e.g., acid chloride or mixed anhydride. Again, the preferred experimental conditions for conducting said acylation are the same as that previously mentioned for the monester wherein $R_2$ is hydrogen and $R_1$ is as previously described.

As was characteristic of the monoesters wherein $R_2$ is hydrogen and $R_1$ is as previously indicated, so too, when compounds of Formula I, wherein $R_1$ is hydrogen and the 3-carboxy group is esterified, are exposed to basic hydrolysis conditions they are converted to the diacid where $R_1$ and $R_2$ are each hydrogen.

Diesters of the present invention, compounds of Formula I wherein $R_1$ and $R_2$ are each selected from the group consisting of alkyl, cycloalkyl, indanyl, naphthyl, α-alkanoyloxyalkyl, phenyl, phenylalkyl, and substituted phenyl and phenylalkyl, are prepared via acylation of the appropriate 6-aminopenicillanic ester with the requisite cycloalkane-1,1-dicarboxylic acid, monoester, the carboxyl group thereof being free or functionalized, e.g., as the acid chloride or mixed anhydride. Said reaction is normally conducted in a reaction-inert, nonaqueous solvent at temperatures of from 0° C. to 50° C., with a preferred range of 20° C. to 30° C. Reaction times, which vary with concentration, temperature and reactivity of the starting reagents, will range anywhere from one to twelve hours.

Upon completion of the above described reaction, the solvent, e.g., methylene chloride, is removed under reduced pressure, the residue partitioned between ethyl acetate and water and the biphasic system rendered acid to pH 1 to 2. The organic phase containing the desired product is adjusted to pH 7 with a saturated solution of sodium bicarbonate, separated and dried over anhydrous sodium sulfate. Removal of the solvent in vacuo provides the crude product.

The cycloalkane-1,1-dicarboxylic acids employed as starting reagents leading to the products of the present invention are either commercially available, e.g., cyclobutane-1,1-dicarboxylic acid, or can be easily prepared by hydrolysis of the commercial diesters according to the procedure employed by Vogel, J. Chem. Soc., 1487 (1929), for the preparation of cyclopropyl-, cyclobutyl-, cyclopentyl- and cyclohexyl-1,1-dicarboxylic acids. Cycloheptyl-1,1-dicarboxylic acid is synthesized according to the method of Saharia et al., J. Sci. Ind. Res., 21B, 480 (1962), C.A. 58, 8921e (1963).

Monoesters of the cycloalkane-1,1-dicarboxylic acids are readily prepared by functionalization of one of the carboxyl groups, i.e., as the mixed anhydride or acid halide, followed by coupling with the appropriate alcohol or phenol, procedures well documented in the chemical literature, Fieser and Fieser, "Reagents for Organic Synthesis," vol. I, John Wiley & Sons, Inc., New York, N.Y., 1967, page 1158 and Wagner and Zook, "Synthetic Organic Chemistry," John Wiley & Sons, Inc., New York, N.Y., 1956, page 481.

Monesters of the cycloalkane-1,1-dicarboxylic acids wherein the ester is derived from an α-alkanoyloxyalkyl moiety, as previously defined, are synthesized by alkylation of a monosalt of the diacid with an α-alkanoyloxyalgyl halide according to the general procedures outlined by Wagner & Zook, "Synthetic Organic Chemistry," John Wiley and Sons, Inc., New York, N.Y., 1956, page 484, for the formation of esters from acid salts and alkyl halides. The requisite α-alkanoyloxyalkyl halides are, in turn, prepared from the corresponding acid chlorides and aldehydes in accordance with the general procedures of Ulich et al., J. Am. Chem Soc., 43, 660 (1921) and Euranto et al., Acta Chem. Scand. 20, 1273 (1966).

Esters of 6-aminopenicillanic acid are synthesized by deacylation of the corresponding benzylpenicillin esters employing the technique of Fechtig et al., Helv. Chim. Acta., 51, 1108 (1968) and Weissenburger, U.S. Pat. 3,499,909. The appropriate benzylpenicillin esters are prepared from the commercially available benzylpenicillin via the methods outlined by Jansen et al., J. Chem. Soc., 3733 (1953) and 2127 (1965).

As has been previously noted, a characteristic feature of the acidic compounds of the instant invention, i.e., wherein $R_1$ or $R_2$ is hydrogen, is their ability to form basic salts. Acid congeners of the present invention are converted to basic salts by the interaction of said acid with an appropriate base in an aqueous or nonaqueous medium. Such basic reagents suitably employed in the preparation of said salts can vary in nature, and are meant to contemplate such bases as organic amines, ammonia, alkali metal hydroxides, carbonates, bicarbonates, hydrides and alkoxides, as well as alkali earth metal hydroxides, hydrides, alkoxides and carbonates. Representative of such bases are ammonia, primary amines such as n-propylamine, n-butylamine, aniline, cyclohexylamine, benzylamine, p-toluidine, ethylamine, octylamine, tertiary amines such as diethylaniline, N-methylpyrrolidine, N-methylmorpholine and 1,5 - diazabicyclo - [4,3,0] - 5-nonene; sodium hydroxide, potassium hydroxide, ammonium hydroxide, sodium ethoxide, potassium methoxide, magnesium hydroxide, calcium hydride and barium hydroxide.

In the utilization of the chemotherapeutic activity of those compounds of the present invention which form basic salts, it is preferred, of course, to use pharmaceutically acceptable salts. Although water insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The said pharmaceutically acceptable salts preferred include the sodium, aluminum, potassium, calcium, magnesium, ammonium and substituted ammonium salts, e.g., procaine, dibenzylamine, N,N'-dibenzylethylenediamine, N,N-bis(dehydroabietyl)-ethylenediamine, 1-ephenamine, N - ethylpiperidine, N - benzyl - β - phenethylamine, triethylamine, as well as salts with other amines which have been used to form salts with benzylpenicillin.

The novel penicillins described herein exhibit in vitro activity against a wide variety of micro-organisms, including both gram-positive and gram-negative bacteria. Their useful activity can readily be demonstrated by in vitro tests against various organisms in a brain-heart infusion medium by the usual two-fold serial dilution technique. The in vitro activity of the herein described compounds renders them useful for topical application in the form of ointments, creams and the like, or for sterilization purposes, e.g., sick-room utensils.

These novel penicillins are also effective antibacterial agents in vivo in animals, including man, not only via the parenteral route of administration but also by the oral route of administration.

The oral and parenteral dosage levels for the herein described compounds are, in general, on the order of up to 200 mg./kg. and 100 mg./kg. of the body weight per day, respectively.

Many of the penicillin ester compounds of this invention exhibit improved absorption on oral administration over that produced by the corresponding free acid or alkali metal salt forms. They, therefore, represent convenient and effective dosage forms of the 6-(1-carboxycycloalkylcarboxamido)-penicillanic acids of Formula I above.

Further, many of the esters described herein, although inactive or of relatively low activity against gram-negative organisms per se when administered orally to animals, including man, metabolized to the parent acid, which has a wide spectrum of activity against gram-positive and gram-negative bacteria. They thus serve as pro-drug forms of the parent compounds since they are biologically converted in vivo to said compounds. The rate of metabolic conversion of such esters to the parent acid occurs at such a rate as to provide an effective and prolonged concentration of the parent acid in the animal body. In effect, such esters act as depot sources for the parent acid.

Especially useful in this respect are those compounds wherein $R_1$ is phenyl or indanyl, $R_2$ is hydrogen and $n$ is an integer of from 2 to 6, and congeners where $R_1$ is hydrogen, $R_2$ is pivaloyloxymethyl and $n$ is an integer of from 2 to 6.

The antimicrobial spectra of 6-(1-carboxycyclobutyl carboxamido)-penicillanic acid and its 1-phenoxycarbonyl ester against several bacteria are presented below. The tests were run under standardized conditions in which nutrient broth containing various concentrations of the test material was seeded with the particular organism specified, and the minimum concentration (MIC) at which growth of each organism failed to occur was observed and recorded. The test materials were tested as their sodium or potassium salts.

TABLE I

In vitro data of 6-(1-carboxycyclobutylcarboxamido)penicillanic acid and its 1-phenoxycarbonyl ester (MIC; mcg./ml.)

| Organism | Disodium salt, MIC | Ester-sodium salt, MIC |
|---|---|---|
| Staphylococcus aureus (resistant) | 50.00 | 50.00 |
| Staphylococcus aureus | 1.56 | 0.195 |
| Streptococcus pyogenes | 0.049 | 0.012 |
| Pasteurella mlutocida | 100.00 | 0.024 |
| Hemophilus influencea | 100.00 | 1.56 |
| Klebsiella pneumoniae | 100.00 | 100.00 |
| Pseudomonas aeruginosa | 6.25 | 6.25 |
| Escherichia coli | 25.00 | 25.00 |
| Proteus mirabilis | 50.00 | 25.00 |

Tables II and IIA present in vivo data for 6-(1-carboxycyclobutylcarboxamido)penicillanic acid and its 1-phenoxycarbonyl ester against several experimental infections in mice. The values (survivors/total number of infected mice) are obtained under standard conditions known to those skilled in the art. The test compound, as its sodium salt, is administered to the infected mice by a multiple dosing regimen in which the first dose is given 0.5 hour after inoculation and is repeated four and twenty-four hours later.

TABLE II

In vivo data for 6-(1-carboxycyclobutylcarboxamido)penicillanic acid vs several bacterial infections in mice [1]

| | E. coli | | Staph. aureus | |
|---|---|---|---|---|
| | PO | SQ | PO | SQ |
| Dose (mg./kg.): | | | | |
| 200 | 5/10 | 8/10 | | |
| 100 | | | 3/10 | 3/10 |
| 50 | 2/10 | 5/10 | | |
| 25 | | | 1/10 | 0/10 |

See footnote at end of Table IIA.

TABLE IIA

In vivo data for 6-[1-(phenoxycarbonyl)cyclobutylcarboxamido]-penicillanic acid vs. bacterial infections in mice [1]

| | E. coli | | Staph. aureus | |
|---|---|---|---|---|
| | PO | SQ | PO | SQ |
| Dose (mg./kg.): | | | | |
| 200 | 8/10 | 9/10 | | |
| 100 | | | 7/10 | 7/10 |
| 50 | 5/10 | 8/10 | | |
| 25 | | | 1/10 | 3/10 |

[1] PO=oral; SQ=subcutaneous route of administration. Ratio of survivors/total mice.

The novel products of this invention are of value as antibacterial agents and are remarkably effective in treating a number of infections caused by susceptible gram-negative and gram-positive bacteria in poultry and animals including man. Several of the compounds exhibit resistance to penicillinase and are effective in treating infections due to resistant Staphylococci. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the for of a sterile aqueous solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are nontoxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

Also effective as antibacterial agents are congeners of Formula I wherein the cycloalkane moiety is substituted by at least one substituent selected from the group consisting of lower alkyl, phenyl and substituted phenyl wherein said substituent is methyl, methoxy, fluorine, chlorine, bromine, hydroxy or di(lower)alkylamino. Said cycloalkane moiety can also be fused to a benzenoid ring which can be substituted in the aromatic portion by methyl, methoxy, fluorine, chlorine, bromine, hydroxy or di(lower)alkylamino without loss of antibacterial activity.

Also within the scope of the present invention are antibacterial esters of Formula I wherein $R_2$ and $n$ are as previously indicated and $R_1$ is selected from the group consisting of substituted phenyl wherein the substituent is phenyl, carboxyvinyl, carbo(lower alkoxy)vinyl, carboxy(lower alkyl), carbo(lower alkoxy)lower alkyl;

Substituted ac indanyl derivatives wherein the substituent is selected from the group consisting of methyl, chloro and bromo;

ac tetrahydronaphthyl and substituted derivatives thereof, wherein the substituent is selected from the group consisting of methyl, chloro and bromo;

1-(lower)alkoxy-2,2,2-trichloroethyl,
1-(lower)alkoxy-2,2,2-trifluoroethyl,
[carbo(lower)alkoxy](lower)alkoxymethyl,
[dicarbo(lower)alkoxy](lower)alkoxymethyl,
3-[1-($R_5$-substituted)piperidyl],
—$(CH_2)_m$—$NR_5R_6$,
—$CH_2$—$CH(CH_3)$—$NR_5R_6$,
—$CH(CH_3)$—$CH_2$—$NR_5R_6$ and
-(lower alkylene)-Y wherein $m$ is an integer from 2 to 3;
$R_5$ is selected from the group consisting of hydrogen, lower alkyl and benzyl; and $R_6$ is selected from the group consisting of lower alkyl, lower alkanoyl, benzyl, phenyl and carbo(lower)alkoxy; with the proviso that when $R_5$ is hydrogen, $R_6$ is lower alkanoyl or carbo(lower)alkoxy; and Y is selected from the group consisting of azetidino, aziridino, pyrrolidino, piperidino, morpholino, thiomorpholino, N-(lower alkyl)piperazino, pyrrolo, imidazolo, 2-imidazolino, 2,5-dimethylpyrrolidino, 1,4,5,6-tetrahydropyrimidino, 4-methylpiperidino and 2,6-dimethylpiperidino;

wherein

Each of lower alkoxy, lower alkanoyl and lower alkyl have from 1 to 4 carbon atoms and (lower alkylene) contains from 1 to 3 carbon atoms; and

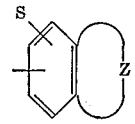

and substituted derivatives thereof, wherein

Z is alkylene and is selected from the group consisting of —$(CH_2)_3$— and —$(CH_2)_4$—, and wherein the substituent S is selected from the group consisting of methyl, chloro and bromo;

γ-phenylallyl, γ-(substituted phenyl)allyl wherein the substituent is selected from the group consisting of at least one of chloro, bromo, fluoro, lower alkoxy, lower alkyl, nitro and methylenedioxy; and γ-phenylpropargyl, γ-(substituted phenyl)propargyl wherein the substituent is selected from the group consisting of chloro, bromo, lower alkoxy, lower alkyl and nitro.

Considered within the purview of the present invention are certain valuable antibacterial nitrogen derivatives of the compounds of Formula I wherein $R_2$ and $n$ are as previously indicated and the —$OR_1$ is replaced by nitrogenous moieties selected from the group consisting of —NHOR where R is hydrogen or alkyl; —NR'R" where R' and R" are each selected from the group consisting of hydrogen, lower alkyl, cycloalkyl, phenyl, substituted phenyl wherein said substituent is selected from the group consisting of methyl, methoxy, fluorine, chlorine, bromine, hydroxy and di(lower)alkylamino, 5- and 6- membered heterocyclic rings containing at least one of the hetero atoms N, O or sulfur, such as 2-pyridinyl, 2-thiazolyl, 2-pyrryl, 4-imidazolyl, 2-oxazolyl, 2-pyrimidinyl, 5-(1,2,4-triazolyl) and fused 5- and 6- membered heterocyclic rings containing at least one N, O or S atoms, e.g., 2-benzothiazolyl, 2-quinolyl and 2-indolyl;

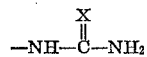

wherein X is selected from the group consisting of O, S and NH; —$NHSO_2R'''$ where R''' is lower alkyl, phenyl or substituted phenyl wherein said substituent is selected from the group consisting of methyl, methoxy, fluorine, chlorine, bromine, hydroxy and di(lower)alkylamino; and

Such compounds have the same utility and are used in substantially the same manner as are the compounds of Formula I. They are prepared in a manner analogous to compounds of Formula I, i.e., the reaction of a functionalized derivative of the 1-carboxy group ($OR_1$=acid halide or mixed anhydride, $R_2$ and $n$ as previously indicated) with the appropriate nitrogenous moiety.

Also included are congeners of Formula I wherein $n$ is as previously indicated and $R_1$ and $R_2$ are each selected from the group consisting of aroyloxyalkyl wherein said aroyl is derived from a nuclear substituted or unsubstituted aromatic acid and said alkyl group contains from 1 to 6 carbon atoms.

The following examples are provided solely for the purpose of illustration and are not to be construed as limitations of this invention, many variations of which are possible without departing from the spirit or scope thereof.

EXAMPLE I

6-[1-carboxycyclobutylcarboxamido]penicillanic acid
(I; $R_1$, $R_2$=H, $n$=3)

In a nitrogen atmosphere a mixture of 0.576 g. (4.0 mmoles) of 1,1-cyclobutanedicarboxylic acid and 0.305 ml. (4.2 mmoles) of thionyl chloride in 6 ml. of diethyl ether containing one drop of dimethylformamide is heated to reflux for several hours. The reaction solution is treated with ethylene dichloride and concentrated under reduced pressure. After this procedure has been repeated twice, the residual material is allowed to remain at room temperature for a half-hour at which time the oil appears partially crystalline.

The monoacid chloride in methylene chloride is added dropwise to a solution of 1.27 g. (4.01 mmoles) of 6-aminopenicillanic acid triethyl amine salt and 0.56 ml. (4.0 mmoles) of triethyl amine in 5 ml. of the same solvent cooled to $-70°$ C. After stirring for 30 minutes an additional 0.56 ml. of triethyl amine is added and the reaction mixture allowed to stir at room temperature overnight. The solvent is removed in vacuo, the residue partitioned between water-ethyl acetate and the pH adjusted to pH 3 with 1.0 N hydrochloric acid. The product is extracted from the ethyl acetate layer into aqueous sodium bicarbonate solution, which is substantially acidified to pH 3 and extracted with fresh ethyl acetate. The final extract is dried over sodium sulfate and concentrated in vacuo to give the desired product as a clear glass, 1.1 g.

The product is converted to the N-ethylpiperidine salt by treating the above acid (3.1 mmoles) in 5 ml. of methylene chloride with .702 g. (6.2 mmoles) of N-ethylpiperidine followed by concentration of the resulting solution to a yellow foam, 1.42 g.

EXAMPLE II

Starting with the appropriate 1,1-cycloalkanedicarboxylic acid and 6-aminopenicillanic acid triethyl amine salt and following the procedure of Example I the following penicillins are prepared:

6-[1-carboxycyclopropylcarboxamido]penicillanic acid,
6-[1-carboxycyclopentylcarboxamido]penicillanic acid,
6-[1-carboxycyclohexylcarboxamido]penicillanic acid, and
6-[1-carboxycycloheptylcarboxamido]penicillanic acid.

EXAMPLE III

6-[1-(phenoxycarbonyl)cyclobutylcarboxamido]penicillanic acid (I; $R_1=\phi$, $R_2=H$, $n=3$)

To a suspension of 4.9 g. (22.7 mmoles) of 6-aminopenicillanic acid in 85 ml. of dry methylene chloride is added 4.6 g. (45 mmoles) of triethyl amine, and the resulting slurry allowed to stir at room temperature for 1.5 hours. The nearly-clear solution is filtered and subsequently cooled to 0° C. in an ice bath. To the resulting cold solution is added, dropwise, 5.4 g. (22.7 mmoles) of phenyl 1-phenoxycarbonyl cyclobutanecarbonyl chloride in 75 ml. of dry methylene chloride at such a rate that the temperature of the reaction mixture does not exceed 10° C. The ice bath is then removed and the reaction allowed to stir at room temperature for one hour. Water (150 ml.) is added to the solution, the pH adjusted to 2 using 1.0 N hydrochloric acid solution and the methylene chloride layer separated. The solvent is removed under reduced pressure and the residue dissolved in ethyl acetate. The organic layer is washed with water, and the product extracted into a saturated solution of sodium bicarbonate and back-washed several times with ethyl acetate. The aqueous layer is finally layered over with ethyl acetate, rendered acid to pH 2 with 1.0 N hydrochloric acid and the organic layer containing the product separated. After drying over sodium sulfate the solvent is removed under reduced pressure to provide the desired material as solid foam, 7.7 g.

The sodium salt is prepared by treating the above penicillin with 1.43 g. of sodium bicarbonate in water followed by extraction of the resulting aqueous solution with ethyl acetate and subsequent freeze-drying of the yellow aqueous solution, 6.02 g.

EXAMPLE IV

Following the procedure of Example III and employing the requisite starting acid halide and 6-aminopenicillanic acid the following congeners are prepared:

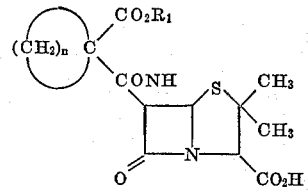

| $R_1$ | n | $R_1$ | n |
|---|---|---|---|
| $C_6H_5-$ | 4 | 4-$CH_3C_6H_4-$ | 5 |
| $C_6H_5-$ | 2 | 3-$CH_3OC_6H_4-$ | 5 |
| $C_6H_5-$ | 5 | 4-$C_2H_5SC_6H_4CH_2-$ | 5 |
| $C_6H_5-$ | 6 | 2-$C_2H_5OC_6H_4-$ | 4 |
| $\alpha$-$C_{10}H_7-$ | 6 | 4-$ClC_6H_4(CH_2)_2-$ | 5 |
| $\beta$-$C_{10}H_7-$ | 6 | 4-$ClC_6H_4-$ | 5 |
| 4-indanyl | 6 | 4-$BrC_6H_4CH_2-$ | 4 |
| 5-indanyl | 2 | 3-$FC_6H_4(CH_2)_3-$ | 4 |
| 5-indanyl | 3 | 4-$FC_6H_4-$ | 4 |
| 5-indanyl | 5 | 4-n-$C_3H_7OC_6H_4-$ | 4 |
| $\alpha$-$C_{10}H_7-$ | 4 | 3-n-$C_3H_7SC_6H_4-$ | 5 |
| $\beta$-$C_{10}H_7-$ | 5 | 4-$CF_3C_6H_4CH_2-$ | 5 |
| $C_6H_5CH_2-$ | 4 | 2-$C_2H_5OC_6H_4-$ | 5 |
| $C_6H_5CH_2-$ | 5 | 4-i-$C_3H_7C_6H_4-$ | 5 |
| $C_6H_5CH_2-$ | 6 | 4-i-$C_3H_7C_6H_4-$ | 6 |
| $C_6H_5(CH_2)_2-$ | 3 | 4-$FC_6H_4CH_2-$ | 2 |
| $C_6H_5(CH_2)_2-$ | 5 | 4-$FC_6H_4CH_2-$ | 5 |
| $C_6H_5CH_2CH(CH_3)-$ | 2 | 4-$FC_6H_4CH_2-$ | 6 |
| $C_6H_5CH_2CH(CH_3)-$ | 4 | 4-$CH_3OC_6H_4-$ | 4 |
| $C_6H_5CH(CH_3)CH_2-$ | 5 | 4-$CH_3OC_6H_4-$ | 5 |
| $C_6H_5CH(CH_3)CH_2-$ | 6 | 4-$CH_3OC_6H_4-$ | 6 |
| 4-$CH_3OC_6H_4(CH_2)_2-$ | 2 | 4-$CF_3C_6H_4(CH_2)_2-$ | 3 |
| 4-$CH_3OC_6H_4(CH_2)_3-$ | 4 | 4-$CF_3C_6H_4(CH_2)_2-$ | 4 |
| 4-$CH_3OC_6H_4(CH_2)_3-$ | 5 | 4-$CF_3C_6H_4(CH_2)_2-$ | 5 |
| 2-$ClC_6H_4CH_2CH(CH_3)-$ | 3 | 3-$CF_3C_6H_4-$ | 2 |
| 2-$ClC_6H_4CH_2CH(CH_3)-$ | 6 | 3-$CF_3C_6H_4-$ | 6 |
| 2-i-$C_3H_7C_6H_4-$ | 3 | 2-$FC_6H_4(CH_2)_2-$ | 2 |
| 2-i-$C_3H_7C_6H_4-$ | 4 | 2-$FC_6H_4(CH_2)_2-$ | 5 |
| 2-i-$C_3H_7C_6H_4-$ | 6 | 2-$FC_6H_4(CH_2)_2-$ | 6 |
| 4-$CH_3SC_6H_4CH(CH_3)CH_2-$ | 5 | 4-$CH_3C_6H_4CH_2-$ | 2 |
| 2-$C_2H_5C_6H_4(CH_2)_2-$ | 5 | 4-$CH_3C_6H_4CH_2-$ | 3 |
| 3-$C_2H_5C_6H_4(CH_2)_2-$ | 5 | 4-$CH_3C_6H_4CH_2-$ | 5 |
| 4-$C_2H_5C_6H_4(CH_2)_2-$ | 5 | 4-$CH_3C_6H_4CH_2-$ | 6 |
| 4-$BrC_6H_4(CH_2)_3-$ | 4 | 2-$CH_3C_6H_4-$ | 5 |
| 4-i-$C_3H_7SC_6H_4CH_2-$ | 3 | 2-n-$C_3H_7C_6H_4-$ | 4 |
| $C_6H_5C(CH_3)_2-$ | 4 | 2-n-$C_3H_7C_6H_4-$ | 5 |
| $C_6H_5C(CH_3)_2-$ | 5 | 2-n-$C_3H_7C_6H_4-$ | 6 |
| $C_6H_5C(CH_3)_2-$ | 6 | 2-n-$C_3H_7C_6H_4C(CH_3)_2-$ | 4 |
| 4-$ClC_6H_4C(CH_3)_2-$ | 5 | 2-n-$C_3H_7C_6H_4C(CH_3)_2-$ | 5 |
| 4-$CH_3OC_6H_4C(CH_3)_2-$ | 5 | 2-n-$C_3H_7C_6H_4C(CH_3)_2-$ | 6 |
| 3-$CH_3OC_6H_4C(CH_3)_2-$ | 5 | 2-n-$C_3H_7OC_6H_4-$ | 4 |
| 4-$C_2H_5C_6H_4C(CH_3)_2-$ | 5 | 2-n-$C_3H_7OC_6H_4-$ | 5 |

EXAMPLE V

6-[1-carboxycyclobutylcarboxamido]penicillanic acid via hydrolysis of phenyl ester To 1.5 l. of pH 9 borate buffer is added 3.0 g. (7 mmoles) of 6 - [1 - (phenoxycarbonyl)cyclobutylcarboxamido]penicillanic acid and the resulting solution allowed to stir at room temperature for 2.5 hours. The reaction mixture is layered over with ethyl acetate and the pH adjusted to 2 with 12 N hydrochloric acid. The ethyl acetate layer containing the product is separated, the product extracted into a saturated sodium bicarbonate solution and the basic solution back-washed several times with ethyl acetate. The bicarbonate solution is finally layered with ethyl acetate, the pH adjusted to 2 and the desired material extracted into the organic phase, which is subsequently dried over sodium sulfate and concentrated to dryness in vacuo. The residual product, 1.1 g., is obtained as a yellow foam and proved to be identical via infrared and nuclear magnetic resonance spectroscopy with the product obtained in Example I.

EXAMPLE VI

The procedure of Example III is again repeated, starting with 6-aminopenicillanic acid and the appropriate 1,1- cycloalkanedicarboxylic acid monoester-monoacid chloride, to provide the following products:

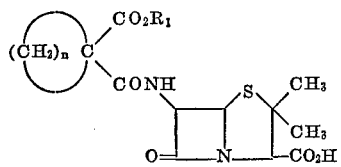

| $R_1$ | n | $R_1$ | n |
|---|---|---|---|
| $CH_3-$ | 3 | $t-C_4H_9-$ | 2 |
| $CH_3-$ | 4 | $t-C_4H_9-$ | 5 |
| $CH_3-$ | 5 | $t-C_4H_9-$ | 6 |
| $CH_3-$ | 6 | Cyclo-$C_3H_5-$ | 3 |
| $C_2H_5-$ | 4 | Cyclo-$C_3H_5-$ | 5 |
| $C_2H_5-$ | 5 | Cyclo-$C_3H_5-$ | 6 |
| $C_2H_5-$ | 6 | Cyclo-$C_4H_7-$ | 5 |
| $n-C_3H_7-$ | 4 | Cyclo-$C_4H_7$ | 6 |
| $n-C_3H_7-$ | 6 | Cyclo-$C_5H_9-$ | 2 |
| $i-C_3H_7-$ | 2 | Cyclo-$C_5H_9-$ | 3 |
| $i-C_3H_7-$ | 4 | Cyclo-$C_5H_9-$ | 4 |
| $i-C_3H_7-$ | 5 | Cyclo-$C_5H_{11}-$ | 4 |
| $i-C_3H_7-$ | 6 | Cyclo-$C_6H_{11}-$ | 5 |
| $n-C_4H_9-$ | 5 | Cyclo-$C_6H_{11}-$ | 6 |
| $n-C_4H_9-$ | 6 | Cyclo-$C_7H_{13}-$ | 3 |
| $s-C_4H_9-$ | 5 | Cyclo-$C_7H_{13}-$ | 4 |
| $s-C_4H_9-$ | 6 | Cyclo-$C_7H_{13}-$ | 5 |
| Cyclo-$C_8H_{15}-$ | 3 | 2-$i-C_3H_7$-cyclo-$C_5H_8-$ | 3 |
| Cyclo-$C_8H_{15}-$ | 4 | 2-$i-C_3H_7$-cyclo-$C_5H_8-$ | 5 |
| Cyclo-$C_8H_{15}-$ | 5 | 2-$i-C_3H_7$-cyclo-$C_5H_8-$ | 3 |
| 2,6-$(CH_3)_2$-cyclo-$C_6H_9-$ | 4 | 4,4-$(CH_3)_2$-cyclo-$C_5H_9-$ | 2 |
| 2,6-$(CH_3)_2$-cyclo-$C_6H_9-$ | 5 | 4,4-$(CH_3)_2$-cyclo-$C_5H_9-$ | 3 |
| 2,6-$(CH_3)_2$-cyclo-$C_6H_9-$ | 6 | 4,4-$(CH_3)_2$-cyclo-$C_5H_9-$ | 4 |
| 2-$C_2H_5$-cyclo-$C_6H_{10}-$ | 5 | $CH_3CO_2CH(n-C_3H_7)-$ | 3 |
| 2-$C_2H_5$-cyclo-$C_6H_{10}-$ | 6 | $CH_3CO_2CH(n-C_3H_7)-$ | 4 |
| $CH_3CO_2CH_2-$ | 3 | $C_2H_5CO_2CH(i-C_3H_7)-$ | 5 |
| $CH_3CO_2CH_2-$ | 4 | $C_2H_5CO_2CH(i-C_3H_7)-$ | 6 |
| $CH_3CO_2CH_2-$ | 5 | $C_2H_5CO_2CH(n-C_4H_9)-$ | 5 |
| $CH_3CO_2CH_2-$ | 6 | $C_2H_5CO_2CH(n-C_4H_9)-$ | 6 |
| $CH_3CO_2CH(CH_3)-$ | 2 | $C_3H_7CO_2CH(s-C_4H_9)-$ | 4 |
| $CH_3CO_2CH(CH_3)-$ | 3 | $C_3H_7CO_2CH(s-C_4H_9)-$ | 5 |
| $CH_3CO_2CH(CH_3)-$ | 4 | $C_3H_7CO_2CH(s-C_4H_9)-$ | 6 |
| $CH_3CO_2CH(CH_3)-$ | 5 | $C_4H_9CO_2CH(n-C_5H_{11})-$ | 5 |
| $CH_3CO_2CH(C_2H_5)-$ | 4 | $C_4H_9CO_2CH(n-C_5H_{11})-$ | 6 |
| $CH_3CO_2CH(C_2H_5)-$ | 6 | $(CH_3)_3CCO_2CH(CH_3)-$ | 2 |
| $C_2H_5CO_2CH_2-$ | 3 | $(CH_3)_3CCO_2CH(CH_3)-$ | 3 |
| $C_2H_5CO_2CH_2-$ | 5 | $(CH_3)_3CCO_2CH(CH_3)-$ | 5 |
| $C_2H_5CO_2CH(CH_3)-$ | 5 | $(CH_3)_3CCO_2CH(CH_3)-$ | 6 |
| $C_3H_7CO_2CH_2-$ | 5 | $(CH_3)_2CHCO_2CH(t-C_4H_9)-$ | 2 |
| $(CH_3)_2CHCO_2CH_2-$ | 5 | $(CH_3)_2CHCO_2CH(t-C_4H_9)-$ | 3 |
| $C_2H_5CO_2CH(C_2H_5)-$ | 5 | $C_4H_9CO_2CH_2-$ | 5 |
| $(CH_3)_3CCO_2CH_2-$ | 2 | $(CH_3)_3CCO_2CH_2-$ | 3 |
| $(CH_3)_3CCO_2CH_2-$ | 4 | $(CH_3)_3CCO_2CH_2-$ | 5 |
| $(CH_3)_3CCO_2CH_2-$ | 6 | | |

EXAMPLE VII

6-[1 - carboxycyclopropylcarboxamido]penicillanic acid, monopivaloyloxymethyl ester, sodium salt (I; $R_1$=H, $R_2$=$CH_2O_2CC(CH_3)_3$, n=2)

1 - carboxycyclopropanecarbonyl chloride, prepared from 787 mg. (6 mmoles) of the diacid and 0.88 ml. of thionyl chloride, is dissolved in 2 ml. of methylene chloride and added to a solution of 1.75 g. (4.8 mmoles) of 6-aminopenicillanic acid, pivaloyloxymethyl ester hydrochloride and 1.67 ml. (12 mmoles) of triethylamine in 20 ml. of methylene chloride cooled to −70° C. The reaction mixture is slowly allowed to warm to room temperature where it is maintained for one hour. The mixture is concentrated, treated with 50 ml. each of ethyl acetate and water and the pH adjusted with 1 N hydrochloric acid to 1.5. The organic phase is separated, washed with water and approximately two-thirds of the solvent removed under reduced pressure. The concentrated solvent is underlayered with water (50 ml.) and the pH adjusted to 7 by the addition of a saturated sodium bicarbonate solution. The organic phase is separated, fresh ethyl acetate added to the aqueous layer and solid sodium chloride added to the saturation point, salting the sodium salt of the desired product into the organic phase, which is subsequently separated, dried over sodium sulfate and concentrated to a solid foam, 1.01 g.

Employing the previously mentioned technique for determining in vivo activity in mice, the following data are indicative of the survival rate when tested against the indicated organism:

| | E. coli | | Staph. aureus | |
|---|---|---|---|---|
| Dose, mg./kg.: | P.O. | S.Q. | P.O. | S.Q. |
| 200 | 3/10 | 1/10 | 6/10 | 8/10 |
| 50 | 3/10 | 1/10 | 2/10 | 4/10 |

EXAMPLE VIII

Starting with the appropriate monoacid chloride and following the procedure of Example VII, the following in vivo data are obtained for the compounds formed:

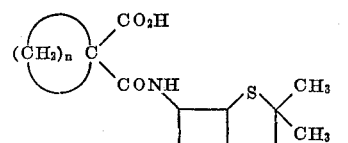

| | | E. coli | | Staph. aureus | |
|---|---|---|---|---|---|
| n | Dose, mg./kg. | P.O. | S.Q. | P.O. | S.Q. |
| 3 | 200 | 8/10 | 10/10 | 10/10 | 10/10 |
| 3 | 50 | 4/10 | 6/10 | 3/10 | 9/10 |
| 4 | 200 | 6/10 | 7/10 | 10/10 | 8/10 |
| 4 | 50 | 3/10 | 0/0 | 2/10 | 6/10 |

EXAMPLE IX

The experimental procedure of Example VII is again repeated, employing the requisite 6-aminopenicillanic acid ester and cycloalkane-1,1-dicarboxylic acid monoacid chloride, to provide the following analogs in moderate yields:

| n | $R_2$ | n | $R_2$ |
|---|---|---|---|
| 3 | $CH_3-$ | 2 | $t-C_4H_9-$ |
| 4 | $CH_3-$ | 5 | $t-C_4H_9-$ |
| 5 | $CH_3-$ | 6 | $t-C_4H_9-$ |
| 6 | $CH_3-$ | 3 | Cyclo-$C_3H_5-$ |
| 4 | $C_2H_5-$ | 5 | Cyclo-$C_3H_5-$ |
| 5 | $C_2H_5-$ | 6 | Cyclo-$C_3H_5-$ |
| 6 | $C_2H_5-$ | 5 | Cyclo-$C_4H_7-$ |
| 4 | $n-C_3H_7-$ | 6 | Cyclo-$C_4H_7-$ |
| 6 | $n-C_3H_7$ | 2 | Cyclo-$C_5H_9-$ |
| 2 | $i-C_3H_7-$ | 3 | Cyclo-$C_5H_9-$ |
| 4 | $i-C_3H_7-$ | 4 | Cyclo-$C_5H_9-$ |
| 5 | $i-C_3H_7-$ | 4 | Cyclo-$C_6H_{11}-$ |
| 6 | $i-C_3H_7-$ | 5 | Cyclo-$C_6H_{11}-$ |
| 5 | $n-C_4H_9-$ | 6 | Cyclo-$C_6H_{11}-$ |
| 6 | $n-C_4H_9-$ | 3 | Cyclo-$C_7H_{13}-$ |
| 5 | $s-C_4H_9-$ | 4 | Cyclo-$C_7H_{13}-$ |
| 6 | $s-C_4H_9-$ | 5 | Cyclo-$C_7H_{13}-$ |
| 3 | Cyclo-$C_8H_{15}-$ | 2 | 4,4-$(CH_3)_2$-cyclo-$C_5H_9-$ |
| 4 | Cyclo-$C_8H_{15}-$ | 3 | 4,4-$(CH_3)_2$-cyclo-$C_5H_9-$ |
| 5 | Cyclo-$C_8H_{15}-$ | 4 | 4,4-$(CH_3)_2$-cyclo-$C_5H_9-$ |
| 4 | 2,6-$(CH_3)_2$-cyclo-$C_6H_9-$ | 3 | $CH_3CO_2CH(n-C_3H_7)-$ |
| 5 | 2,6-$(CH_3)_2$-cyclo-$C_6H_9-$ | 4 | $CH_3CO_2CH(n-C_3H_7)-$ |
| 6 | 2,6-$(CH_3)_2$-cyclo-$C_6H_9-$ | 5 | $C_2H_5CO_2CH(i-C_3H_7)-$ |
| 5 | 2-$C_2H_5$-cyclo-$C_6H_{10}-$ | 6 | $C_2H_5CO_2CH(i-C_3H_7)-$ |
| 6 | 2-$C_2H_5$-cyclo-$C_6H_{10}-$ | 5 | $C_2H_5CO_2CH(n-C_4H_9)-$ |
| 3 | $CH_3CO_2CH_2-$ | 6 | $C_2H_5CO_2CH(n-C_4H_9)-$ |
| 4 | $CH_3CO_2CH_2-$ | 4 | $C_3H_7CO_2CH(s-C_4H_9)-$ |
| 5 | $CH_3CO_2CH_2-$ | 5 | $C_3H_7CO_2CH(s-C_4H_9)-$ |
| 6 | $CH_3CO_2CH_2-$ | 6 | $C_3H_7CO_2CH(s-C_4H_9)-$ |
| 2 | $CH_3CO_2CH(CH_3)-$ | 5 | $C_4H_9CO_2CH(n-C_5H_{11})-$ |
| 3 | $CH_3CO_2CH(CH_3)-$ | 6 | $C_4H_9CO_2CH(n-C_5H_{11})-$ |
| 4 | $CH_3CO_2CH(CH_3)-$ | 2 | $(CH_3)_3CCO_2CH(CH_3)-$ |
| 5 | $CH_3CO_2CH(CH_3)-$ | 3 | $(CH_3)_3CCO_2CH(CH_3)-$ |
| 4 | $CH_3CO_2CH(C_2H_5)-$ | 5 | $(CH_3)_3CCO_2CH(CH_3)-$ |
| 6 | $CH_3CO_2CH(C_2H_5)-$ | 6 | $(CH_3)_3CCO_2CH(CH_3)-$ |
| 3 | $C_2H_5CO_2CH_2-$ | 2 | $(CH_3)_2CHCO_2CH(t-C_4H_9)-$ |
| 5 | $C_2H_5CO_2CH_2$ | 3 | $(CH_3)_2CHCO_2CH(t-C_4H_9)-$ |
| 5 | $C_2H_5CO_2CH(CH_3)-$ | 5 | $C_3H_7CO_2CH_2-$ |
| 5 | $(CH_3)_2CHCO_2CH_2-$ | 5 | $C_2H_5CO_2CH(C_2H_5)-$ |
| 5 | $C_4H_9CO_2CH_2-$ | 5 | $(CH_3)_3CCO_2CH_2-$ |
| 6 | $(CH_3)_3CCO_2CH_2-$ | 3 | 2-$i-C_3H_7$-cyclo-$C_5H_8-$ |
| 5 | 2-$i-C_3H_7$-cyclo-$C_5H_8-$ | 6 | 2-$i-C_3H_7$-cyclo-$C_5H_8-$ |

EXAMPLE X

Starting with the appropriate 6-aminopenicillanic acid aryl ester and cycloalkane-1,1-decarboxylic acid monoacid chloride, and employing the synthetic procedure of Example VII, the following compounds are obtained:

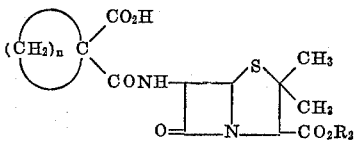

| n | $R_2$ | n | $R_2$ |
|---|---|---|---|
| 2 | $C_6H_5$— | 5 | $C_2H_5CH(CH_3)CH_2$— |
| 4 | $C_6H_5$— | 6 | $C_6H_5CH(CH_3)CH_2$— |
| 5 | $C_6H_5$— | 5 | 4-$CH_3C_6H_4$— |
| 6 | $C_6H_5$— | 5 | 3-$CH_3OC_6H_4$— |
| 6 | $\alpha$-$C_{10}H_7$— | 5 | 4-$C_2H_5SC_6H_4CH_2$ |
| 6 | $\beta$-$C_{10}H_7$— | 4 | 2-$C_2H_5OC_6H_4$— |
| 6 | 4-indanyl | 5 | 4-$ClC_6H_4(CH_2)_2$— |
| 2 | 5-indanyl | 5 | 4-$ClC_6H_4$— |
| 3 | 5-indanyl | 4 | 4-$BrC_6H_4CH_2$— |
| 5 | 5-indanyl | 4 | 3-$FC_6H_4(CH_2)_3$— |
| 4 | $\alpha$-$C_{10}H_7$— | 4 | 4-$FC_6H_4$— |
| 5 | $\beta$-$C_{10}H_7$— | 4 | 4-n-$C_3H_7OC_6H_4$— |
| 4 | $C_6H_5CH_2$— | 3 | 4-n-$C_3H_7SC_6H_4$— |
| 5 | $C_6H_5CH_2$— | 4 | 4-$CF_3C_6H_4CH_2$— |
| 6 | $C_6H_5CH_2$— | 5 | 2-$C_2H_5OC_6H_4$— |
| 3 | $C_6H_5(CH_2)_2$— | 5 | 4-i-$C_3H_7C_6H_4$— |
| 5 | $C_6H_5(CH_2)_2$— | 6 | 4-i-$C_3H_7C_6H_4$— |
| 2 | $C_6H_5CH_2CH(CH_3)$— | 4 | $C_6H_5CH_2CH(CH_3)$— |
| 4 | 4-$FC_6H_4CH_2$ | 3 | 4-$CF_3C_6H_4(CH_2)_2$— |
| 5 | 4-$FC_6H_4CH_2$ | 4 | 4-$CF_3C_6H_4(CH_2)_2$— |
| 6 | 4-$FC_6H_4CH_2$— | 5 | 4-$CF_3C_6H_4(CH_2)_2$— |
| 4 | 4-$CH_3OC_6H_4$— | 2 | 3-$CF_3C_6H_4$— |
| 5 | 4-$CH_3OC_6H_4$— | 6 | 3-$CF_3C_6H_4$— |
| 6 | 4-$CH_3OC_6H_4$— | 2 | 2-$FC_6H_4(CH_2)_2$— |
| 2 | 4-$CH_3OC_6H_4(CH_2)_3$— | 5 | 2-$FC_6H_4(CH_2)_2$— |
| 4 | 4-$CH_3OC_6H_4(CH_2)_3$— | 6 | 2-$FC_6H_4(CH_2)_2$— |
| 5 | 4-$CH_3OC_6H_4(CH_2)_3$— | 2 | 4-$CH_3C_6H_4CH_2$— |
| 3 | 2-$ClC_6H_4CH_2CH(CH_3)$— | 3 | 4-$CH_3C_6H_4CH_2$— |
| 6 | 2-$ClC_6H_4CH_2CH(CH_3)$— | 5 | 4-$CH_3C_6H_4CH_2$— |
| 3 | 2-i-$C_3H_7C_6H_4$— | 6 | 4-$CH_3C_6H_4CH_2$— |
| 4 | 2-i-$C_3H_7C_6H_4$— | 5 | 2-$CH_3C_6H_4$— |
| 6 | 2-i-$C_3H_7C_6H_4$— | 4 | 2-n-$C_3H_7C_6H_4$— |
| 5 | 4-$CH_3SC_6H_4CH(CH_3)CH_2$— | 5 | 2-n-$C_3H_7C_6H_4$— |
| 5 | 2-$C_2H_5C_6H_4(CH_2)_2$— | 6 | 2-n-$C_3H_7C_6H_4$— |
| 3 | 3-$C_2H_5C_6H_4(CH_2)_2$— | 4 | 2-n-$C_3H_7C_6H_4C(CH_3)_2$— |
| 5 | 4-$C_2H_5C_6H_4(CH_2)_2$— | 5 | 2-n-$C_3H_7C_6H_4C(CH_3)_2$— |
| 4 | 4-$BrC_6H_4(CH_2)_3$— | 6 | 2-n-$C_3H_7C_6H_4C(CH_3)_2$— |
| 3 | 4-i-$C_3H_7SC_6H_4CH_2$— | 4 | 2-n-$C_3H_7OC_6H_4$— |
| 4 | $C_6H_5C(CH_3)_2$— | 5 | 2-n-$C_3H_7OC_6H_4$— |
| 5 | $C_6H_5C(CH_3)_2$— | 6 | $C_6H_5C(CH_3)_2$— |
| 5 | 4-$ClC_6H_4C(CH_3)_2$— | 5 | 4-$CH_3OC_6H_4C(CH_3)_2$— |
| 5 | 3-$CH_3OC_6H_4C(CH_3)_2$— | 5 | 4-$C_2H_5C_6H_4C(CH_3)_2$— |

EXAMPLE XI

6 - [1 - (phenoxycarbonyl)cyclopropylcarboxamido] penicillanic acid, pivaloyloxymethyl ester
(I; $R_1=\phi$, $R_2=CH_2O_2CC(CH_3)_3$, $n=2$)

To a solution of 1.75 g. (4.8 mmoles) of 6-aminopenicillanic acid, pivaloyloxymethyl ester hydrochloride in 20 ml. of methylene chloride is added 1.67 ml. (12 mmoles) of triethylamine and the hazy suspension cooled to 0° C. in an ice bath. To the resulting cooled reaction mixture is slowly added 1.14 g. (4.8 mmoles) of 1-phenoxycarbonylcyclopropanecarbonyl chloride in 10 ml. of the same solvent at such a rate that the temperature does not exceed 10° C. The ice bath is removed after the addition is complete, and the reaction allowed to stir at room temperature for 2 hours. Water (50 ml.) is added and the pH adjusted to 2 using 1 N hydrochloric acid. The organic phase is separated, subsequently washed with water (2× 50 ml.) and finally with a dilute sodium bicarbonate solution. The methylene chloride layer is separated, dried over sodium sulfate and concentrated in vacuo to provide the desired product as a slightly mobile oil.

EXAMPLE XII

Employing the aforedescribed procedure of Example XI, and utilizing as starting reagents the requisite 6-aminopenicillanic acid ester and cycloalkane-1,1-dicarboxylic acid half-ester, half-acid halide, the following penicillins are prepared:

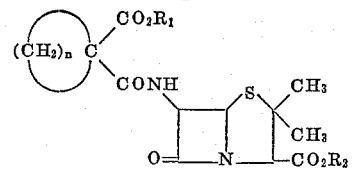

| n | $R_1$ | $R_2$ |
|---|---|---|
| 2 | $CH_3$— | $CH_3$— |
| 2 | $CH_3$— | $C_2H_5$— |
| 2 | $CH_3$— | n-$C_3H_7$— |
| 4 | $CH_3$— | $C_2H_5$— |
| 4 | $CH_3$— | Cyclo-$C_5H_{11}$— |
| 5 | $CH_3$— | $CH_3$— |
| 5 | $CH_3$— | $C_6H_5$— |
| 5 | $CH_3$— | $(CH_3)_3CCO_2CH_2$— |
| 5 | $CH_3$— | $C_6H_5CH_2CH(CH_3)$— |
| 5 | $CH_3$— | $CH_3CO_2CH_2$— |
| 4 | $C_2H_5$— | $C_2H_5CO_2CH_2$— |
| 4 | $C_2H_5$— | $C_6H_5(CH_2)_2$— |
| 4 | $C_2H_5$— | $(CH_3)_2CHCO_2CH_2$— |
| 4 | $C_2H_5$— | Cyclo-$C_6H_{11}$— |
| 5 | $C_2H_5$— | s-$C_4H_9$— |
| 5 | $C_2H_5$— | $\alpha$-$C_{10}H_7$— |
| 5 | $C_2H_5$— | $\beta$-$C_{10}H_7$— |
| 4 | i-$C_3H_7$— | $CH_3$— |
| 4 | i-$C_3H_7$— | $C_6H_5$— |
| 4 | i-$C_3H_7$— | 4-$CH_3OC_6H_4$— |
| 4 | i-$C_3H_7$— | 4-$BrC_6H_4CH_2$— |
| 4 | i-$C_3H_7$— | 2-$C_2H_5OC_6H_4$— |
| 5 | Cyclo-$C_3H_5$— | $C_6H_5$— |
| 5 | Cyclo-$C_5H_9$— | Cyclo-$C_5H_9$— |
| 5 | Cyclo-$C_5H_9$— | $CH_3COCH(CH_3)$— |
| 5 | Cyclo-$C_6H_{11}$— | 4-indanyl |
| 5 | Cyclo-$C_6H_{11}$— | 5-indanyl |
| 3 | $CH_3CO_2CH_2$— | 4-$ClC_6H_4(CH_2)_2$— |
| 3 | $CH_3CO_2CH_2$— | $CH_3$— |
| 3 | $CH_3CO_2CH_2$— | i-$C_3H_7$— |
| 5 | $CH_3CO_2CH(CH_3)$— | $CH_3CO_2CH_2$— |
| 5 | $CH_3CO_2CH(CH_3)$— | $CH_3CO_2CH_2$— |
| 5 | $CH_3CO_2CH(CH_3)$— | $(CH_3)_3CCO_2CH_2$— |
| 5 | $CH_3CO_2CH(CH_3)$— | $C_6H_5$— |
| 5 | $CH_3CO_2CH(CH_3)$— | Cyclo-$C_5H_9$— |
| 5 | $(CH_3)_2CHCO_2CH_2$— | $C_2H_5CH(CH_3)CH_2$— |
| 5 | $(CH_3)_2CHCO_2CH_2$— | n-$C_3H_7$— |
| 5 | $(CH_3)_2CHCO_2CH_2$— | $C_2H_5CH_2$— |
| 5 | $(CH_3)_2CHCO_2CH_2$— | 3-$FC_6H_4(CH_2)_3$— |
| 5 | $(CH_3)_2CHCO_2CH_2$— | 4-$C_2H_5SC_6H_4CH_2$— |
| 3 | $CH_3CO_2CH(n$-$C_3H_7)$— | $CH_3$— |
| 3 | $CH_3CO_2CH(n$-$C_3H_7)$— | $CH_3CO_2CH_2$— |
| 3 | $CH_3CO_2CH(n$-$C_3H_7)$— | $C_4H_9CO_2CH_2$— |
| 3 | $CH_3CO_2CH(n$-$C_3H_7)$— | 4-n-$C_4H_9OC_6H_4$— |
| 5 | $C_4H_9CO_2CH(n$-$C_5H_{11})$— | n-$C_4H_9$— |
| 5 | $C_4H_9CO_2CH(n$-$C_5H_{11})$— | 4-$CF_3C_6H_4CH_2$— |
| 5 | $C_4H_9CO_2CH(n$-$C_5H_{11})$— | Cyclo-$C_8H_{15}$— |
| 4 | 4,4-$(CH_3)_2$-cbclo-$C_2H_9$— | $CH_3$— |
| 4 | 4,4-$(CH_3)_2$-cbclo-$C_2H_9$— | $C_2H_5$— |
| 4 | 4,4-$(CH_3)_2$-cbclo-$C_2H_9$— | $CH_3CO_2CH_2$— |
| 2 | 5-indanyl | $CH_3$— |
| 2 | 5-indanyl | $C_2H_5$— |
| 2 | 5-indanyl | $C_6H_5$— |
| 2 | 5-indanyl | $CH_3CO_2CH_2$— |
| 3 | 5-indanyl | $CH_3$— |
| 3 | 5-indanyl | $(CH_3)_3CCO_2CH_2$— |
| 3 | 5-indanyl | Cyclo-$C_5H_9$— |
| 3 | 5-indanyl | n-$C_3H_7$— |
| 5 | 5-indanyl | 4-$CH_3OC_6H_4$— |
| 5 | 5-indanyl | $CH_3CO_2CH(CH_3)$— |
| 5 | 5-indanyl | $C_2H_5$— |
| 6 | $\alpha$-$C_{10}H_7$— | Cyclo-$C_6H_{11}$— |
| 6 | $\alpha$-$C_{10}H_7$— | 4-$CH_3C_6H_4CH_2$— |
| 6 | $\alpha$-$C_{10}H_7$— | n-$C_4H_9$— |
| 6 | $\beta$-$C_{10}H_7$— | $CH_3CO_2CH(C_2H_5)$— |
| 6 | $\beta$-$C_{10}H_7$— | 4-i-$C_3H_7C_6H_4$— |
| 6 | $\beta$-$C_{10}H_7$— | $CH_3$— |
| 4 | $C_6H_5$— | n-$C_4H_9$— |
| 4 | $C_6H_5$— | Cyclo-$C_3H_5$— |
| 4 | $C_6H_5$— | $C_2H_5$— |
| 5 | $C_6H_5$— | $CH_3CO_2CH_2$— |
| 5 | $C_6H_5$— | 2-$C_2H_5OC_6H_4$— |
| 5 | $C_6H_5$— | $CH_3$— |
| 6 | $C_6H_5$— | $(CH_3)_3CCO_2CH_2$— |
| 6 | $C_6H_5$— | 2-n-$C_3H_7C_6H_4C(CH_3)_2$— |
| 6 | $C_6H_5$— | $CH_3$— |
| 5 | 3-$CH_3OC_2H_4$— | $CH_3CO_2CH(C_2H_5)$— |
| 5 | 3-$CH_3OC_2H_4$— | 5-indanyl |
| 5 | 3-$CH_3OC_2H_4$— | $CH_3CO_2CH_2$— |
| 4 | 4-n-$C_3H_7OC_6H_4$— | t-$C_4H_9$— |
| 4 | 4-$CH_3C_6H_4$— | $(CH_3)_2CHCO_2CH_2$— |
| 4 | 4-$CH_3C_6H_4$— | $CH_3$— |
| 3 | 2-i-$C_3H_7C_6H_4$— | n-$C_3H_7$— |
| 3 | 2-i-$C_3H_7C_6H_4$— | Cyclo-$C_6H_{11}$— |
| 3 | 2-i-$C_3H_7C_6H_4$— | $(CH_3)_3CCO_2CH_2$— |
| 4 | 2-i-$C_3H_7C_6H_4$— | $CH_3$— |
| 4 | 2-i-$C_3H_7C_6H_4$— | 4-$CH_3OC_6H_4(CH_2)_3$— |
| 4 | 2-i-$C_3H_7C_6H_4$— | $CH_3$— |
| 6 | 2-i-$C_3H_7C_6H_4$— | $CH_3COCH(CH_3)$— |
| 6 | 2-i-$C_3H_7C_6H_4$— | 4-$CH_3C_6H_4CH_2$— |
| 5 | 4-$FC_6H_4CH_2$— | $C_2H_5$— |
| 4 | 3-$FC_2H_4(CH_2)_3$— | $C_2H_5$— |
| 6 | 2-$C(C_2H_4CH_2CH(CH_3)$— | $C_2H_5$— |
| 5 | 4-$ClC_6H_4C(CH_3)_2$— | $C_2H_5$— |
| 2 | 3-$CF_3C_6H_4$— | $C_2H_5$— |
| 3 | 4-$CF_3C_6H_4(CH_2)_2$— | $C_2H_5$— |
| 2 | 2-$FC_6H_4(CH_2)_2$— | $C_2H_5$— |
| 5 | 4-$C_2H_5SC_6H_4CH_2$— | $CH_3$— |
| 5 | 4-$C_2H_5SC_6H_4CH_2$— | $CH_3CO_2CH_2$— |
| 5 | 4-$C_2H_5SC_6H_4CH_2$— | $(CH_3)_3CCO_2CH_2$— |
| 5 | $CH_3SC_6H_4CH(CH_3)CH_2$— | $(CH_3)_3CCO_2CH_2$— |

EXAMPLE XIII

A tablet base is prepared by blending the following ingredients in the proportion by weight indicated.

| | |
|---|---|
| Sucrose, U.S.P. | 80.0 |
| Tapioca starch | 12.5 |
| Magnesium stearate | 7.5 |

Sufficient 6-[1-carboxycyclobutylcarboxamido]penicillanic acid, 3-pivaloyloxymethyl ester is blended into the base to provide tablets containing 25, 100 and 250 mg. of active ingredient.

EXAMPLE XIV

Capsules containing 25, 100 and 250 mg. of active ingredient are prepared by blending sufficient 6-[1-(5 - indanyloxycarbonyl)cyclobutylcarboxamido]penicillanic acid in the following mixture (proportions given in parts by weight.):

| | |
|---|---|
| Calcium carbonate, U.S.P. | 17.5 |
| Dicalcium phosphate | 18.9 |
| Magnesium trisilicate | 4.2 |
| Lactose, U.S.P. | 6.2 |
| Potato starch | 5.2 |
| Magnesium stearate | 1.0 |

EXAMPLE XV

A suspension of 6-[1-carboxycyclopentylcarboxamido] penicillanic acid, 3-pivaloyloxymethyl sodium salt is prepared with the following composition:

| | | |
|---|---|---|
| Penicillin compound | g | 31.42 |
| 70% aqueous sorbitol | g | 714.29 |
| Glycerine, U.S.P. | g | 185.35 |
| Gum acacia (10% solution) | ml | 100.00 |
| Polyvinyl pyrrolidone | g | 0.50 |
| Propyl parahydroxybenzoate | g | 0.172 |
| Distilled water to make one liter | g | 0.094 |

Various sweetening and flavoring agents may be added to this suspension, as well as acceptable coloring. The suspension contains approximately 25 mg. of penicillin compound per milliliter.

EXAMPLE XVI

A parenteral form of 6-[1-(2-i-propylphenoxycarbonyl)cyclobutylcarboxamido]penicillanic acid, sodium salt is prepared by dissolving an intimate mixture of the penicillin compound and sodium citrate (4% by weight) in sufficient polyethylene glycol 200 such that the final concentration of the penicillin compound is 25 mg. of active ingredient per milliliter. The resulting solution is sterilized by filtration and sterilely stoppered in vials.

In like manner, formulations of the products of this invention are made.

EXAMPLE XVII

In a manner similar to Example XIV, capsules containing 25, 100 and 250 mg. of 6-[1-carboxycyclobutylcarboxamido]penicillanic acid are prepared.

EXAMPLE XVIII

The free acids of Examples VI and IX are converted to their monosodium, potassium, calcium, magnesium, ammonium, procaine, N,N'-dibenzylethylenediamine, N-ethylpiperidine, 1-ephenamine and triethylamine salts by reaction of aqueous solutions thereof with one equivalent of the appropriate base. The salts are recovered by freeze drying.

PREPARATION A

Cycloalkane-1,1-Dicarboxylic Acid, Monoester-Monoacid Chloride (I) 1-phenoxycarbonylcyclobutanecarbonyl chloride (a) 1-phenoxycarbonylcyclobutanecarboxylic acid.—
To a dry flask, under a nitrogen atmosphere, is added 10.0 g. (0.069 mole) of 1,1-cyclobutanedicarboxylic acid, 6.6 g. (0.007 mole) of phenol and 5.4 g. (0.035 mole) of phosphorous oxychloride and the resulting slurry stirred rapidly at 90–95° C. for one hour. Benzene (30 ml.) is added to the clear solution and refluxing continued for ten minutes. The benzene layer is washed with water, the product extracted from the organic phase with an aqueous solution of sodium bicarbonate and the aqueous bricabonate layer washed with ether. The aqueous solution is rendered acid to pH 2 with concentrated hydrochloric acid and the released product extracted with ether. The ether layer is separated, dried over sodium sulfate and concentrated under reduced pressure to provide the desired product as a white crystalline material, 8.2 g., M.P. 90–91.5° C.

(b) 1-phenoxycarbonylcyclobutanecarbonyl chloride.—
To 75 ml. of dry methylene chloride is added 5.0 g. (22.7 mmoles) of 1-phenoxycarbonylcyclobutanecarboxylic acid, and 2.85 g. (24 mmoles) of thionyl chloride and the resulting solution heated to reflux for 2.5 hours. The solvent is removed from the yellow reaction mixture under reduced pressure affording the product as a yellow oil, 5.4 g.

(II) Repeating the above procedures of Preparation A–I(a) and (b), and employing the appropriate cycloalkane-1,1-dicarboxylic acid and alcohol or phenol, the following compounds, not previously reported in the literature, are prepared as intermediates:

$$(CH_2)_n \; C \begin{array}{c} CO_2R_1 \\ \\ COCl \end{array}$$

| n | R₁ | n | R₁ |
|---|---|---|---|
| 2 | C₆H₅— | 5 | 4-CH₃C₆H₄— |
| 4 | C₆H₅— | 5 | 3-CH₃OC₆H₄— |
| 5 | C₆H₅— | 5 | 4-C₂H₅SC₆H₄CH₂— |
| 6 | C₆H₅— | 4 | 2-C₂H₅OC₆H₄— |
| 6 | α-C₁₀H₇— | 5 | 4-ClC₆H₄(CH₂)₂— |
| 6 | β-C₁₀H₇— | 5 | 4-ClC₆H₄— |
| 6 | 4-indanyl | 4 | 4-BrC₆H₄CH₂— |
| 2 | 5-indanyl | 4 | 3-FC₆H₄(CH₂)₃— |
| 3 | 5-indanyl | 4 | 4-FC₆H₄— |
| 5 | 5-indanyl | 4 | 4-n-C₃H₇OC₆H₄— |
| 4 | α-C₁₀H₇— | 5 | 3-n-C₃H₇SC₆H₄— |
| 5 | β-C₁₀H₇— | 5 | 4-CF₃C₆H₄CH₂— |
| 4 | C₆H₅CH₂— | 5 | 2-C₂H₅OC₆H₄— |
| 5 | C₆H₅CH₂— | 5 | 4-i-C₃H₇C₆H₄— |
| 6 | C₆H₅CH₂— | 6 | 4-i-C₃H₇C₆H₄— |
| 3 | C₆H₅(CH₂)₂— | 2 | 4-FC₆H₄CH₂— |
| 5 | C₆H₅(CH₂)₂— | 5 | 4-FC₆H₄CH₂— |
| 2 | C₆H₅CH₂CH(CH₃)— | 6 | 4-FC₆H₄CH₂— |
| 4 | C₆H₅CH₂CH(CH₃)— | 4 | 4-CH₃OC₆H₄— |
| 5 | C₆H₅CH(CH₃)CH₂— | 5 | 4-CH₃OC₆H₄— |
| 6 | C₆H₅CH(CH₃)CH₂— | 6 | 4-CH₃OC₆H₄— |
| 2 | 4-CH₃OC₆H₄(CH₂)₃— | 3 | 4-CF₃C₆H₄(CH₂)₂— |
| 4 | 4-CH₃OC₆H₄(CH₂)₃— | 4 | 4-CF₃C₆H₄(CH₂)₂— |
| 5 | 4-CH₃OC₆H₄(CH₂)₃— | 5 | 4-CF₃C₆H₄(CH₂)₂— |
| 3 | 2-ClC₆H₄CH₂CH(CH₃)— | 2 | 3-CF₃C₆H₄— |
| 6 | 2-ClC₆H₄CH₂CH(CH₃)— | 6 | 3-CF₃C₆H₄— |
| 3 | 2-i-C₃H₇C₆H₄— | 2 | 2-FC₆H₄(CH₂)₂— |
| 4 | 2-i-C₃H₇C₆H₄— | 5 | 2-FC₆H₄(CH₂)₂— |
| 6 | 2-i-C₃H₇C₆H₄— | 6 | 2-FC₆H₄(CH₂)₂— |
| 4 | 4-CH₃SC₆H₄CH(CH₃)CH₂— | 2 | 4-CH₃C₆H₄CH₂— |
| 2 | 2-C₂H₅C₆H₄(CH₂)₂— | 3 | 4-CH₃C₆H₄CH₂— |
| 3 | 3-C₂H₅C₆H₄(CH₂)₂— | 4 | 4-CH₃C₆H₄CH₂— |
| 5 | 4-C₂H₅C₆H₄(CH₂)₂— | 6 | 4-CH₃C₆H₄CH₂— |
| 4 | 4-BrC₆H₄(CH₂)₃— | 5 | 2-CH₃C₆H₄— |
| 3 | 4-i-C₃H₇SC₆H₄CH₂— | 4 | 2-n-C₃H₇C₆H₅— |
| 4 | C₆H₅C(CH₃)₂— | 5 | 2-n-C₃H₇C₆H₅— |
| 5 | C₆H₅C(CH₃)₂— | 6 | 2-n-C₃H₇C₆H₅— |
| 6 | C₆H₅C(CH₃)₂— | 4 | 2-n-C₃H₇C₆H₄C(CH₃)₂— |
| 5 | 4-ClC₆H₄C(CH₃)₂— | 5 | 2-n-C₃H₇C₆H₄C(CH₃)₂— |
| 5 | 4-ClC₆H₄C(CH₃)₂— | 6 | 2-n-C₃H₇C₆H₄C(CH₃)₂— |
| 5 | 3-ClC₆H₄C(CH₃)₂— | 4 | 2-n-C₃H₇OC₆H₄— |
| 5 | 4-C₂H₅C₆H₄C(CH₃)₂— | 5 | 2-n-C₃H₇OC₆H₄— |
| 3 | CH₃— | 2 | t-C₄H₉— |
| 4 | CH₃— | 5 | t-C₄H₉— |
| 5 | CH₃— | 6 | t-C₄H₉— |
| 6 | CH₃— | 3 | Cyclo-C₃H₅— |
| 4 | C₂H₅— | 5 | Cyclo-C₃H₅— |
| 5 | C₂H₅— | 6 | Cyclo-C₃H₅— |
| 6 | C₂H₅— | 5 | Cyclo-C₄H₇— |
| 4 | n-C₃H₇— | 6 | Cyclo-C₄H₇— |
| 6 | n-C₃H₇— | 2 | Cyclo-C₅H₉— |
| 2 | i-C₃H₇— | 3 | Cyclo-C₅H₉— |
| 4 | i-C₃H₇— | 4 | Cyclo-C₅H₉— |
| 5 | i-C₃H₇— | 4 | Cyclo-C₆H₁₁— |
| 6 | i-C₃H₇— | 5 | Cyclo-C₆H₁₁— |
| 5 | n-C₄H₉— | 6 | Cyclo-C₆H₁₁— |
| 6 | n-C₄H₉— | 3 | Cyclo-C₇H₁₃— |
| 5 | s-C₄H₉— | 4 | Cyclo-C₇H₁₃— |
| 6 | s-C₄H₉— | 5 | Cyclo-C₇H₁₃— |
| 3 | Cyclo-C₈H₁₅— | 3 | 2-i-C₃H₇-cyclo-C₅H₈— |
| 4 | Cyclo-C₈H₁₅— | 5 | 2-i-C₃H₇-cyclo-C₅H₈— |
| 5 | Cyclo-C₈H₁₅— | 6 | 2-i-C₃H₇-cyclo-C₅H₈— |
| 4 | 2,6-(CH₃)₂-cyclo-C₆H₉— | 2 | 4,4-(CH₃)₂-cyclo-C₆H₉— |
| 5 | 2,6-(CH₃)₂-cyclo-C₆H₉— | 3 | 4,4-(CH₃)₂-cyclo-C₆H₉— |
| 6 | 2,6-(CH₃)₂-cyclo-C₆H₉— | 4 | 4,4-(CH₃)₂-cyclo-C₆H₉— |
| 5 | 2-C₂H₅-cyclo-C₆H₁₀— | 6 | 2-C₂H₅-cyclo-C₆H₁₀— |

17

(III) 1-pivaloyloxymethyloxycarbonylcyclobutanecarbonyl chloride (a) 1 - pivaloyloxymethyloxycarbonylcyclobutanecarboxylic acid.—To a solution of 14.4 g. (0.01 mole) of cyclobutane-1,1-dicarboxylic acid in 120 ml. of dry dimethylformamide is added in portions 980 mg. (0.02 mole) of 50% sodium hydride in an oil suspension. When the evolution of hydrogen ceases, 500 mg. of potassium iodide is added followed by the dropwise addition of 1.5 g. (0.01 mole) of pivaloyloxymethyl chloride. The reaction mixture is allowed to stir at room temperature overnight after which it is treated with 50 ml. of water and 100 ml. of ethyl acetate. The aqueous layer is extracted further with ethyl acetate (3× 100 ml.) and is finally saturated with sodium chloride and acidified with concentrated hydrochloric acid to pH 2. The desired product is extracted with ether which is subsequently dried over sodium sulfate and concentrated to a viscous oil which could not be induced to crystallize.

(b) Pivaloyloxymethyloxycarbonylcyclobutanecarbonyl chloride.—To 50 ml. of dry methylene chloride is added 5.16 g. (0.02 mole) of 1-pivaloyloxymethyloxycarbonylcyclobutanecarboxylic acid and 2.62 (0.022 mole) of thionyl chloride and the resulting reaction mixture heated to reflux for two hours. The product, isolated by removal of the solvent under reduced pressure, exists as a clear yellow oil.

(IV) Employing the requisite cycloalkane-1,1-dicarboxylic acid and α-acyloxyalkyl halide, and repeating the above procedures of Preparation A–III(a) and (b), the following compounds not previously reported in the chemical literature are prepared:

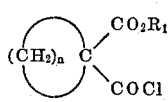

| n | R₁ | n | R₁ |
|---|---|---|---|
| 3 | CH₃CO₂CH₂— | 3 | CH₃CO₂CH(n-C₃H₇)— |
| 4 | CH₃CO₂CH₂— | 4 | CH₃CO₂CH(n-C₃H₇)— |
| 5 | CH₃CO₂CH₂— | 5 | C₂H₅CO₂CH(i-C₃H₇)— |
| 6 | CH₃CO₂CH₂— | 6 | C₂H₅CO₂CH(i-C₃H₇)— |
| 2 | CH₃CO₂CH(CH₃)— | 5 | C₂H₅CO₂CH(n-C₄H₉)— |
| 3 | CH₃CO₂CH(CH₃)— | 6 | C₂H₅CO₂CH(n-C₄H₉)— |
| 4 | CH₃CO₂CH(CH₃)— | 4 | C₃H₇CO₂CH(s-C₄H₉)— |
| 5 | CH₃CO₂CH(CH₃)— | 5 | C₃H₇CO₂CH(s-C₄H₉)— |
| 4 | CH₃CO₂CH(C₂H₅)— | 6 | C₃H₇CO₂CH(s-C₄H₉)— |
| 6 | CH₃CO₂CH(C₂H₅)— | 5 | C₄H₉CO₂CH(n-C₅H₁₁)— |
| 3 | C₂H₅CO₂CH₂— | 6 | C₄H₉CO₂CH(n-C₅H₁₁)— |
| 5 | C₂H₅CO₂CH₂— | 2 | (CH₃)₃CCO₂CH(CH₃)— |
| 5 | C₂H₅CO₂CH(CH₃)— | 3 | (CH₃)₃CCO₂CH(CH₃)— |
| n-C₃H₇CO₂CH₂— |  | 5 | (CH₃)₃CCO₂CH(CH₃)— |
| 5 | (CH₃)₂CHCO₂CH₂— | 6 | (CH₃)₃CCO₂CH(CH₃)— |
| 5 | C₂H₅CO₂CH(C₂H₅)— | 2 | (CH₃)₃CCO₂CH(t-C₄H₉)— |
| 5 | C₄H₉CO₂CH₂— | 3 | (CH₃)₂CHCO CH(t-C₄H₉)— |
| 2 | (CH₃)₃CCO₂CH₂— | 3 | (CH₃)₃CCO₂CH₂— |
| 4 | (CH₃)₃CCO₂CH₂— | 5 | (CH₃)₃CCO₂CH₂— |
| 6 | (CH₃)₃CCO₂CH₂— |   |   |

PREPARATION B

6-aminopenicillanic acid esters (I)-6-aminopenicillanic acid, 3-phenyl ester To 33.9 g. (0.163 mole) of phosphorous pentachloride in 700 ml. of dry methylene chloride and cooled to —25° C. is added 26.3 ml. (0.326 mole) of pyridine followed by the dropwise addition of 60.4 g. (0.148 mole) of benzylpenicillin, 3-phenyl ester, prepared according to the method as taught by Barnden et al., J. Chem. Soc., 3733 (1953), in 100 ml. of the same solvent. The reaction mixture is stirred for two hours, allowed to warm to —10° to —15° C. and is subsequently cooled to —50° C. and treated with 125 ml. of dry butanol over a period of 15 minutes. Stirring is continued for 2.5 hours at

18

—25° C. after which 315 ml. of water and 315 ml. of a saturated sodium chloride solution is added. The hydrolyzed reaction mixture is allowed to stir for 15 minutes at —3° C. followed by the separation of the organic layer. The aqueous layer is overlayed with 1 l. of methylene chloride, the pH adjusted to 7.35 with 2 N sodium hydroxide solution. The methylene chloride layer is separated, dried over sodium sulfate and concentrated under reduced pressure to a tan gum, which is used without further purification.

(II) Starting with benzylpenicillin and the appropriate alcohol and employing the procedure of Barnden et al., followed by the above described procedure I, the following 6-aminopenicillanic esters, employed as intermediates, are prepared:

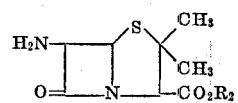

| R₂ | R₂ |
|---|---|
| CH₃— | α-C₁₀H₇— |
| C₂H₅— | β-C₁₀H₇— |
| n-C₃H₇— | 4-indanyl |
| i-C₃H₇— | 5-indanyl |
| n-C₄H₉— | 2-CH₃C₆H₄— |
| s-C₄H₉— | 4-CH₃C₆H₄— |
| t-C₄H₉— | 2-i-C₃H₇C₆H₄— |
| cyclo-C₃H₅— | 4-i-C₃H₇C₆H₄— |
| cyclo-C₄H₇— | 2-n-C₃H₇C₆H₄— |
| cyclo-C₅H₉— | 3-CH₃OC₆H₄— |
| cyclo-C₆H₁₁— | 4-CH₃OC₆H₄— |
| cyclo-C₇H₁₃— | 2-C₂H₅OC₆H₄— |
| cyclo-C₈H₁₅— | 4-n-C₃H₇OC₆H₄— |
| 2,6-(CH₃)₂-cyclo-C]H₉— | 2-n-C₃H₇OC₆H₄— |
| 2-C₂H₅-cyclo-C₆H₁₀— | 3-n-C₃H₇SC₆H₄— |
| 4,4-(CH₃)₂-cyclo-C₆H₉— | 4-ClC₆H₄— |
| 2-i-C₃H₇-cyclo-C₆H₈— | 4-FC₆H₄— |
| C₆H₅(CH₂)₂— | 3-CF₃C₆H₄— |
| C₆H₅CH(CH₃)CH₂— | C₆H₅CH₂— |
| 4-ClC₂H₄CH₂CH(CH₃)— | C₆H₅CH₂CH₂— |
| 4-CH₃SC₆H₄CH(CH₃)CH₂— | 4-CH₃C₆H₄CH₂— |
| 4-BrC₆H₄(CH₂)₃— | 4-CH₃OC₆H₄(CH₂)₃— |
| 4-i-C₃H₇SC[H₄CH₂— | 2-C₂H₅SC[H₄(CH₂)₂— |
| 4-CF₃C₆H₄(CH₂)₂— | 3-C₂H₅SC₆H₄(CH₂)₂— |
| 4-ClC₆H₄(CH₂)₂— | 4-C₂H₅SC₆H₄(CH₂)₂— |
| 4-FC₆H₄CH₂— | 4-BrC₆H₄CH₂— |
| 3-FC₆H₄(CH₂)₃— | 4-CF₃C₆H₄CH₂— |
| 4-C₂H₅SC₇H₄CH₂— | 4-ClC₆H₄C(CH₃)₂— |
| C₆H₅C(CH₃)₂— | 4-CH₃OC₆H₄C(CH₃)₂— |
| 4-C₂H₅C₆H₄C(CH₃)₂— | 3-CH₃OC₆H₄C(CH₃)₂— |
| 2-n-C₃H₇C₆H₄C(CH₃)₂— | 2-FC₆H₄(CH₂)₂— |

(III) 6-aminopenicillanic acid, 3-α-acetoxyethyl ester (a) Benzylpenicillin, 3-α-acetoxyethyl ester.—To 120 g. (0.338 mole) of benzylpenicillin sodium salt in 500 ml. of dry dimethylformamide is added 41.28 g. (0.338 mole) of α-acetoxyethyl chloride and 4.8 g. of potassium iodide. The resulting reaction mixture is allowed to stir at room temperature for 40.5 hours after which it is added to 3 l. of ice water and 1 l. of chloroform. The organic layer is separated, dried over sodium sulfate and concentrated in vacuo to a brown oil. The oil is redissolved in 1 l. of ethyl acetate, underlayed with 1 l. of water, the pH of which is adjusted to 6.95 with 2 N sodium hydroxide solution and the mixture shaken. The organic layer is separated, dried over sodium sulfate and concentrated to a yellow foam, 64.54 g.

(b) 6-Aminopenicillanic acid, 3-α-acetoxyethyl ester.—Following the procedure of Preparation B–I for the deacylation of benzylpenicillin esters, 33.9 g. (0.163 mole) of phosphorous pentachloride, 26.3 ml. of pyridine and 62.7 g. of benzylpenicillin, 3-α-acetoxyethyl ester in 700 ml. of methylene chloride provided 19.8 g. of the desired product as a brown gum.

(IV) Starting with benzylpenicillin and the requisite α-acyloxyalkyl halide and following the procedures of Preparation B–II(a) and (b), the following 6-aminopenicillanic acid esters are prepared:

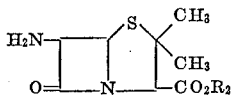

| R₂ | R₂ |
|---|---|
| CH₃CO₂CH₂— | C₂H₅CO₂CH(C₂H₅)— |
| CH₃CO₂CH(C₂H₅)— | C₄H₉CO₂CH₂— |
| C₂H₅CO₂CH₂— | (CH₃)₃CCO₂CH₂— |
| C₂H₅CO₂CH(CH₃)— | CH₃CO₂CH(n-C₃H₇)— |
| C₃H₇CO₂CH₂— | C₂H₅CO₂CH(i-C₃H₇)— |
| (CH₃)₂CHCO₂CH₂— | C₂H₅CO₂CH(n-C₄H₉)— |
| C₃H₇CO₂CH(s-C₄H₉)— | C₄H₉CO₂CH(n-C₅H₁₁)— |
| (CH₃)₃CCO₂CH(t-C₄H₉)— | (CH₃)₃CCO₂CH(CH₃)— |

What is claimed is:

1. A compound selected from the group consisting of penicillins having the formula:

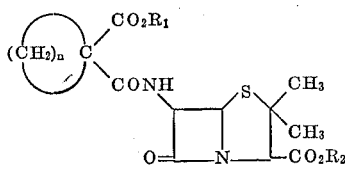

wherein
R₁ and R₂ are each selected from the group consisting of hydrogen; alkyl containing from 1 to 4 carbon atoms; cycloalkyl containing from 3 to 8 carbon atoms; indanyl; naphthyl; α-alkanoyloxyalkyl wherein said alkanoyl group contains from 2 to 5 carbon atoms and said alkyl contains from 1 to 6 carbon atoms; phenyl and substituted phenyl wherein said substituent is selected from the group consisting of alkyl, alkoxy and alkylthio containing from 1 to 3 carbon atoms, fluorine, chlorine, bromine and trifluoromethyl; phenylalkyl and substituted phenylalkyl wherein said alkyl group contains from 1 to 3 carbon atoms and said substituent is selected from the group consisting of alkyl, alkoxy and alkylthio containing from 1 to 3 carbon atoms, fluorine, chlorine, bromine and trifluoromethyl;
n is an integer from 2 to 6;
and the pharmaceutically acceptable basic salts of those compounds wherein at least one of R₁ and R₂ is hydrogen.

2. A compound of claim 1 wherein R₁ is hydrogen and R₂ is α-alkanoyloxyalkyl wherein said alkanoyl contains from 2 to 5 carbon atoms and said alkyl contains from 1 to 6 carbon atoms.

3. The compound of claim 2 wherein n is 2 and R₂ is (CH₃)₃CCO₂CH₂—.

4. The compound of claim 2 wherein n is 3 and R₂ is (CH₃)₃CCO₂CH₂—.

5. The compound of claim 2 wherein n is 4 and R₂ is (CH₃)₃CCO₂CH₂—.

6. The compound of claim 2 wherein n is 5 and R₂ is (CH₃)₃CCO₂CH₂—.

7. The compound of claim 2 wherein n is 2 and R₂ is CH₃CO₂CH(CH₃)—.

8. The compound of claim 2 wherein n is 3 and R₂ is CH₃CO₂CH(CH₃)—.

9. The compound of claim 2 wherein n is 4 and R₂ is CH₃CO₂CH(CH₃)—.

10. The compound of claim 2 wherein n is 5 and R₂ is CH₃CO₂CH(CH₃)—.

11. The compound of claim 2 wherein n is 2 and R₂ is CH₃CO₂CH₂—.

12. The compound of claim 2 wherein n is 3 and R₂ is CH₃CO₂CH₂—.

13. The compound of claim 2 wherein n is 4 and R₂ is CH₃CO₂CH₂—.

14. The compound of claim 2 wherein n is 5 and R₂ is CH₃CO₂CH₂—.

15. A compound of claim 1 wherein R₁ and R₂ are hydrogen.

16. The compound of claim 15 wherein n is 2.

17. The compound of claim 15 wherein n is 3.

18. The compound of claim 15 wherein n is 4.

19. The compound of claim 15 wherein n is 5.

20. A compound of claim 1 wherein R₁ is phenyl and R₂ is hydrogen.

21. A compound of claim 1 wherein R₁ is o-isopropylphenyl and R₂ is hydrogen.

22. A compound of claim 1 wherein R₁ is indanyl and R₂ is hydrogen.

23. A compound of claim 1 wherein R₁ is benzyl and R₂ is hydrogen.

24. A compound of claim 1 wherein R₁ and R₂ are each α-alkanoyloxyalkyl wherein said alkanoyl contains from 2 to 5 carbon atoms and said alkyl contains from 1 to 6 carbon atoms.

References Cited
UNITED STATES PATENTS

| 3,492,291 | 1/1970 | Brain et al. | 260—239.1 |
| 3,557,094 | 1/1971 | Butler | 260—239.1 |

NICHOLAS S. RIZZO, Primary Examiner

U.S. Cl. X.R.

424—271